United States Patent [19]

Layh

[11] Patent Number: 4,604,537
[45] Date of Patent: Aug. 5, 1986

[54] AC TACHO-GENERATOR

[76] Inventor: Hans-Dieter Layh, Zachersweg 17, D-7121 Gemmrigheim, Fed. Rep. of Germany

[21] Appl. No.: 647,135

[22] Filed: Sep. 4, 1984

[30] Foreign Application Priority Data

Sep. 9, 1983 [DE] Fed. Rep. of Germany ....... 3332533

[51] Int. Cl.$^4$ ............................................. H02K 11/00
[52] U.S. Cl. .................................. 310/68 R; 310/72; 310/91; 310/171; 310/254
[58] Field of Search ................... 310/171, 68 R, 68 C, 310/68 D, 72, 42, 216, 91, 254, 256, 258, 218, 217, 179, 259

[56] References Cited

U.S. PATENT DOCUMENTS

| 2,619,573 | 11/1952 | Dawson | 310/68 C |
|---|---|---|---|
| 2,794,136 | 5/1957 | Kalikow | 310/68 C |
| 3,142,773 | 7/1964 | Snoberger | 310/68 R |
| 3,260,873 | 7/1966 | Wilson | 310/72 |
| 3,466,477 | 9/1969 | Newill | 310/171 |
| 3,504,209 | 3/1970 | Russell | 310/171 |
| 3,736,446 | 5/1973 | Honeywell | 310/171 |
| 4,230,961 | 10/1980 | Calfo | 310/72 |
| 4,400,140 | 8/1983 | Papst | 310/72 |

FOREIGN PATENT DOCUMENTS

| 0177180 | 6/1953 | Austria | 310/68 C |
|---|---|---|---|
| 2407870 | 8/1975 | Fed. Rep. of Germany | 310/171 |
| 3024665 | 1/1982 | Fed. Rep. of Germany | 310/68 C |
| 0047704 | 4/1977 | Japan | 310/68 C |
| 0064601 | 5/1977 | Japan | 310/68 C |
| 0049346 | 3/1982 | Japan | 310/68 C |

Primary Examiner—R. Skudy
Attorney, Agent, or Firm—Michael J. Striker

[57] ABSTRACT

The stator of the tacho-generator is assembled of a pack of sheet steel lamellae defining an annular yoke portion and inwardly projecting poles for stator windings. The yoke portions of the pack are formed with an axially directed cutout for accommodating circuit elements of the tacho-generator.

5 Claims, 2 Drawing Figures

AC TACHO-GENERATOR

BACKGROUND OF THE INVENTION

The invention relates to an AC tacho-generator comprising a multiple pole stator, the poles of which are magnetically connected together in a ring by means of yokes, and also a rectifier circuit and/or a protective circuit electrically coupled to the pole windings.

Such AC tacho-generators are used in many measuring circuits and control circuits, in particular for speed regulated motors in order to measure the speed of the motor and to pass this speed as an actual value to a motor control circuit.

Multiple phase AC tacho-generators are generally used for this purpose and are as a rule combined with a rectifier circuit and/or a protective circuit.

The housing of this circuit has to date not been satisfactory in as much as no adequate space saving arrangement could be found which would also have ensured simple assembly of the stator.

SUMMARY OF THE INVENTION

Accordingly it is the principal object of the invention to provide an AC tacho-generator in which the rectifier circuit and/or the protective circuit is housed in a particularly space saving manner and can be assembled with the stator without difficulties.

In keeping with this object, one feature of this invention resides in that the rectifier circuit and/or the protective circuit is arranged in a cut-out in the annular yokes constituting the stator of the tacho-generator.

The invention is based on the general thought that the cross-section of the yokes of tacho-generators can be weakened in comparison with normal generators or motors because, in contrast to normal generators or motors, the resulting deterioration in efficiency as a result of the higher magnetic resistance is acceptable for tacho-generators having regard to their intended purpose. The invention thus consciously avoids trying to obtain the highest possible degree of efficiency in the normal way and instead, while tolerating a small reduction of the degree of efficiency, APA provides room within the space taken up by the yokes of the stator for accomodating circuits which would otherwise have to be arranged outside of the stator, or on its outside.

In a particularly favourable arrangement the cut-out extends through the stator from one endface of the stator to the other. The stator conveniently consists of a pack of stacked congruent sheet steel laminae or plates each of which has an opening whose contour corresponds to that of the cut-out.

It is particularly convenient if a supporting plate and/or conductor plate for the rectifier circuit and/or the protective circuit is secured at one end of the cut-out, i.e. close to one endface of the laminar stator. In a particularly favoured embodiment an additional supporting plate and/or conductor plate is provided and is movably arranged inside the cut-out, with the additional plate being mounted on the first mentioned plate by means of circuit elements which are exposed to thermal load, such as diodes.

Having regard to the space requirement a particularly favourable result is obtained when the windings of the poles are directly wound around the pole cores which have a reduced cross-section relative to the adjoining pole shoes. With this construction the inner periphery of each winding is smaller than the periphery of the respective pole shoe. This construction is characterised by a particularly small space requirement for the windings in distinction to the previously customary construction in which preprepared coils having an inner periphery which exceeds the periphery of the pole shoes are laid onto the poles as windings.

BRIEF DESCRIPTION OF THE DRAWING

Further preferred features of the invention will be evident from the following discussion of a specific embodiment which is illustrated in the accompanying drawing. This drawing shows in.

DESCRIPTION OF THE PREFERRED EMBODIMENT

Figure 1:
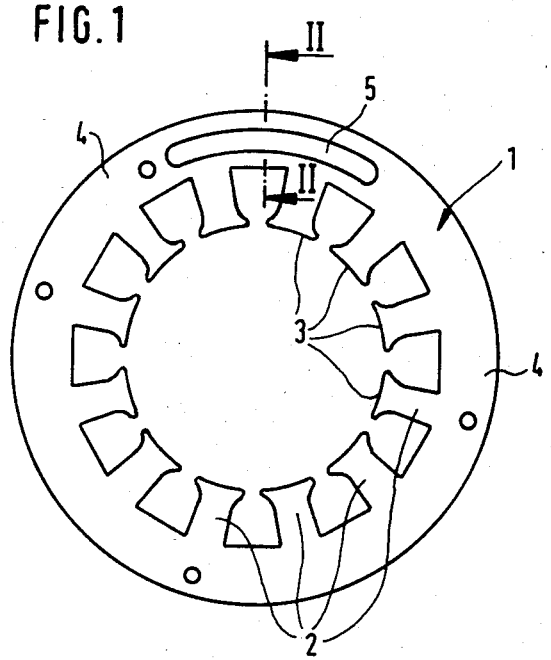
FIG. 1 a plan view of a sheet metal lamina or plate which when stacked together with a plurality of identical lamellae forms the poles and yokes of the stator, and FIG. 2 a sectional view of the cut-out provided in the stator in accordance with the sectional line II—II in FIG. 1.

The stator of the tacho-generator of the invention consists of a plurality of sheet steel lamella 1 which are laid in congruent form on one another to form a pack and are connected together. Each lamella 1 has a ring-like shape with inwardly projecting elements which form the pole cores and also the pole shoes which adjoin the inner ends of the pole cores 2. The remaining regions of the lamella 1 serve as annular yokes 4 which magnetically connect the poles 2, 3. The windings 10 for the poles 2, 3 are simply wound directly around the pole cores 2 with the intermediary of a thin electrical insulator.

Figure 2:
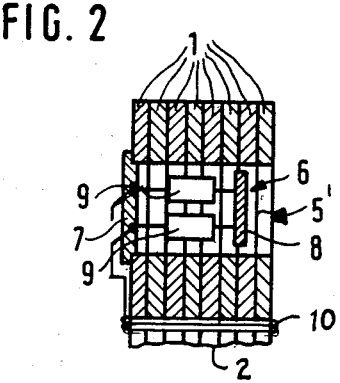

An elongate opening 5 is provided in the yoke 4 of each lamella 1 serves to receive a rectifier circuit and/or a protective circuit 6 which is schematically illustrated in FIG. 2.

The cut-out 5' resulting from the aligned openings 5 extends between endfaces of the stator formed by stacked lamella 1. The cutout is closed at one of the endfaces either wholly or in part by a support plate and/or conductor plate 7 which carries a rectifier circuit and/or protective circuit 6.

If required an additional support plate or conductor plate 8 can be arranged within the cut-out 5 without being rigidly connected to one of the sheet metal lamellae 1. This additional support and/or conductor plate 8 which serves for supporting further circuit elements is connected with the first support plate and/or conductor plate 7 by thermally loaded circuit elements, such as diodes 9 which heat up in operation and change their external dimensions. As a result of movable arrangement of the additional support plate and/or conductor plate 8 in the cut-out 5, thermal strains are thus precluded.

What we claim and desire to have protected by Letters Patent is set forth in the appended claims.

I claim:

1. An AC tacho-generator comprising a multiple pole stator with pole windings, said stator consisting of a magnetically interconnected pack of stacked, congruent steel laminae, each lamina defining an annular yoke portion; a plurality of poles projecting radially inwardly from the yoke portion, and an opening formed in each yoke portion, the openings of the yoke portions, in the pack forming a cut-out extending through the stator from endface to endface thereof; and electronic circuitry arranged in the cut-out, said circuitry including circuit elements coupled to said pole windings, a first supporting plate secured at one end of the cut-out and a second supporting plate movably arranged inside the cut-out, the second supporting plate being mounted on the first supporting plate by means of said circuit elements to neutralize thermal expansion of the latter.

2. An AC tacho-generator in accordance with claim 1 wherein the circuitry is a protective circuit.

3. An AC tacho-generator in accordance with claim 1 wherein the circuitry is a rectifier circuit.

4. An AC tacho-generator in accordance with claim 1 wherein at least one of said supporting plates is a conductor plate.

5. An AC tacho-generator in accordance with claim 1 wherein the poles of the stator have pole shoes and pole cores which have a reduced cross-section relative to the pole shoes, said pole windings being wound around said pole cores within the boundary of said pole shoes.

* * * * *